United States Patent
Serezat

(10) Patent No.: US 6,768,933 B2
(45) Date of Patent: Jul. 27, 2004

(54) METHOD FOR INDICATING A MOTOR VEHICLE CHANGE OF DIRECTION AND DEVICE THEREFOR

(75) Inventor: Laurent Serezat, Corbreuse (FR)

(73) Assignee: Peugeot Citroen Automobiles SA, Velizy-Villacoublay (FR)

(*) Notice: Subject to any disclaimer, the term of this patent is extended or adjusted under 35 U.S.C. 154(b) by 10 days.

(21) Appl. No.: 10/181,922

(22) PCT Filed: Oct. 12, 2001

(86) PCT No.: PCT/FR01/03176

§ 371 (c)(1),
(2), (4) Date: Jul. 26, 2002

(87) PCT Pub. No.: WO02/32719

PCT Pub. Date: Apr. 25, 2002

(65) Prior Publication Data

US 2003/0004643 A1 Jan. 2, 2003

(30) Foreign Application Priority Data

Oct. 17, 2000 (FR) .......................... 00 13283

(51) Int. Cl.⁷ .............................................. G06F 17/00
(52) U.S. Cl. .............................. 701/1; 701/49; 340/475
(58) Field of Search ................................ 701/1, 41, 49; 340/475, 476, 478, 463, 464, 465

(56) References Cited

U.S. PATENT DOCUMENTS

| | | | | |
|---|---|---|---|---|
| 5,122,796 A | * | 6/1992 | Beggs et al. ................ 340/904 |
| 5,339,075 A | * | 8/1994 | Abst et al. ................... 340/903 |
| 5,712,618 A | | 1/1998 | McKenna .................... 340/475 |
| 5,754,100 A | * | 5/1998 | Park .......................... 340/435 |
| 5,919,246 A | * | 7/1999 | Waizmann et al. ......... 701/209 |
| 5,926,117 A | * | 7/1999 | Gunji et al. ................. 340/988 |
| 6,199,001 B1 | * | 3/2001 | Ohta et al. .................... 701/51 |
| 6,211,778 B1 | * | 4/2001 | Reeves ....................... 340/436 |
| 6,249,214 B1 | * | 6/2001 | Kashiwazaki ............ 340/425.5 |
| 6,353,788 B1 | * | 3/2002 | Baker et al. .................. 701/96 |
| 6,370,475 B1 | * | 4/2002 | Breed et al. ................. 701/301 |
| 6,388,565 B1 | * | 5/2002 | Bernhard et al. ........... 340/435 |
| 6,577,334 B1 | * | 6/2003 | Kawai et al. ................ 348/148 |

FOREIGN PATENT DOCUMENTS

| | | |
|---|---|---|
| DE | 198 18 236 A1 | 10/1999 |
| EP | 0 860 001 B1 | 8/1998 |
| WO | WO 00/14697 | 3/2000 |

* cited by examiner

*Primary Examiner*—Tan Nguyen
(74) *Attorney, Agent, or Firm*—Westerman, Hattori, Daniels & Adrian LLP

(57) ABSTRACT

The invention concerns a method for indicating a change in direction of a motor vehicle, which consists in detecting the vehicle steering angle so as to automatically switch on lighting means indicating change of direction, and comprises a step of detecting the presence of another adjacent vehicle and/or the crossing of a marking line on the ground separating traffic lanes, and, when the turning angle of the wheels is greater than a specified threshold value and the presence of an adjacent vehicle and/or the crossing of a line separating traffic lanes is detected, the corresponding lighting means for indicating the change of direction are switched on automatically.

29 Claims, 1 Drawing Sheet

METHOD FOR INDICATING A MOTOR VEHICLE CHANGE OF DIRECTION AND DEVICE THEREFOR

Figure 1:
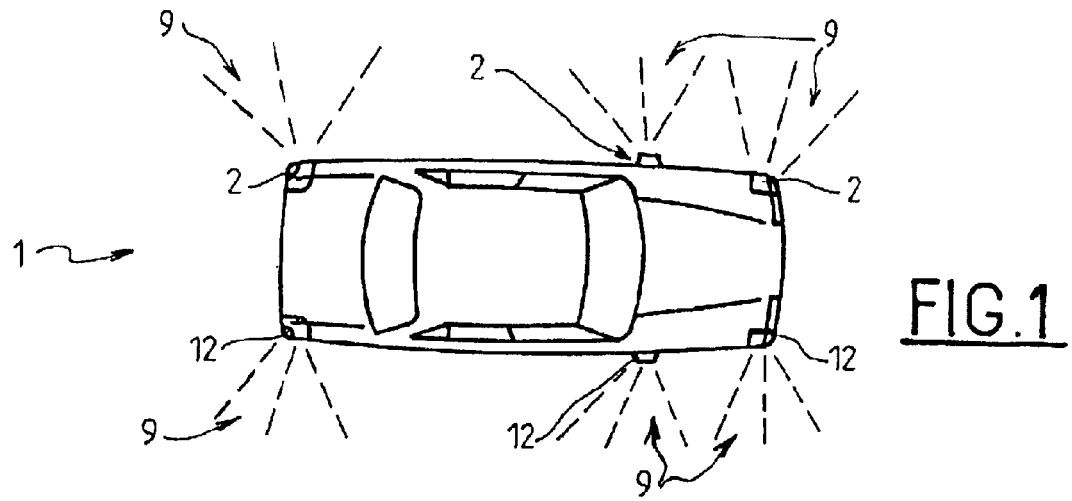

The invention relates to a method for indicating a change in direction of a motor vehicle, as well as to a device for implementing the method.

The invention involves more particularly a method for indicating a change in direction of a motor vehicle, consisting of detecting the turning angle of the wheels of the vehicle for the purpose of automatically switching on lighting means for indicating a change in direction.

Notably from the document U.S. Pat. No. 5,673,019, a device is known that controls the automatic switching on of the turn signal lights of a vehicle as a function of the turning angle of the wheels. The device described in this document is characterized by the fact that the switching on of the direction indicators is proportional to the turning angle of the wheels.

However, the automatic turn signal switching devices of the prior art are not fully satisfactory. In fact, these devices can cause useless untimely switching and are not sufficiently adapted to the functioning conditions of the vehicle.

A purpose of the present invention is to propose a method for indicating a change in the direction of a motor vehicle, which corrects all or part of the disadvantages of the prior art noted above.

This purpose is achieved by the fact that the method for indicating a change in direction of a motor vehicle consists of detecting the turning angle of the wheels of the vehicle for the purpose of automatically switching on lighting means for indicating a change in direction, and comprises a step of detecting the presence of another adjacent vehicle and/or the crossing of a marking line on the ground separating traffic lanes, and in that, when the turning angle of the wheels is greater than a specified threshold value and the presence of an adjacent vehicle and/or the crossing of a line separating traffic lanes is detected, the corresponding lighting means for indicating the change of direction are switched on automatically.

In addition, the invention can comprise one or more of the following characteristics:

the method comprises a step of measuring the speed of the vehicle and a step of determining the threshold value of the turning angle as a function of the speed of the vehicle, when the speed of the vehicle is less than or equal to a first specified speed, the threshold value of the turning angle of the wheels is approximately equal to a first specified constant value, when the speed of the vehicle is between the first speed and a second specified speed greater than the first speed, the threshold value of the turning angle of the wheels decreases when the speed of the vehicle increases, when the speed of the vehicle is between the second speed and a specified third speed greater than the second speed, the threshold value of the turning angle of the wheels is approximately equal to a specified constant second value.

Another purpose of the invention is to propose a device for indicating a change in direction of a motor vehicle, which implements the method according to any one of the previous characteristics.

This purpose is achieved by the fact that the device for indicating the change in direction of a motor vehicle comprises light signaling means, means for collecting data relating to the functioning conditions of the vehicle suitable for determining the turning of the vehicle wheels, means for controlling the supply voltage of the light signaling means, the means for collecting data are adapted to detect the presence or not of another adjacent vehicle and/or the crossing of a marking line on the ground separating the traffic lanes, in order to ensure the automatic switching on of the light signaling means when the turning angle of the wheels is greater than a specified threshold value and the presence of an adjacent vehicle and/or the crossing of a line separating traffic lanes is detected.

In addition, the invention can comprise one or more of the following characteristics:

the means for collecting data are suitable for determining the speed of the vehicle, and the means for controlling the supply voltage determine the threshold value of the turning angle of the wheels as a function of the speed of the vehicle, the means for collecting data relating to the functioning conditions of the vehicle comprise detecting means of the radar type, in order to detect the possible presence of another adjacent vehicle, the means for collecting data relating to the functioning conditions of the vehicle comprise means for receiving information relating to the state of road traffic emitted by emitting means of the satellite type, in order to detect the possible presence of another adjacent vehicle, the means for collecting data relating to the functioning conditions of the vehicle comprise means for detecting the position of the vehicle relative to marking lines on the ground separating traffic lanes, such as infrared emitting and receiving means, in order to detect the possible crossing of these lines by the vehicle.

Figure 2:
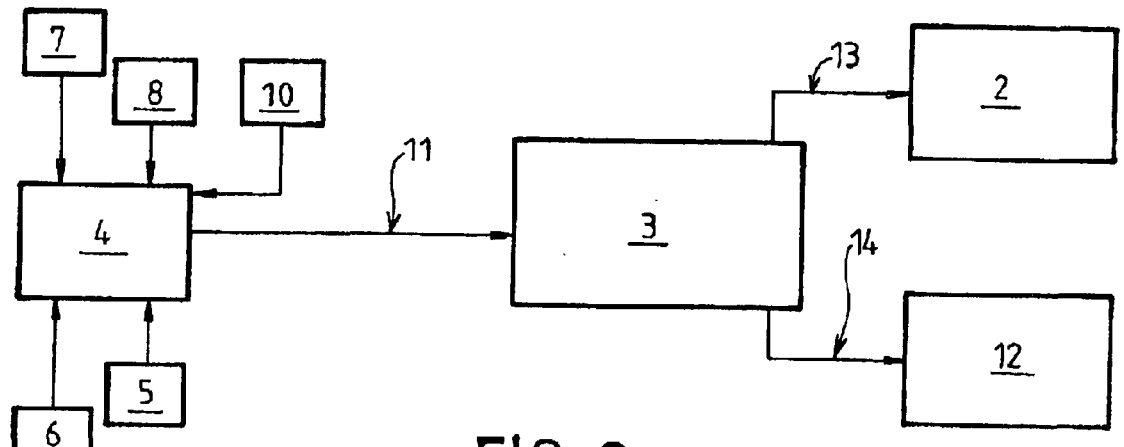
Figure 3:
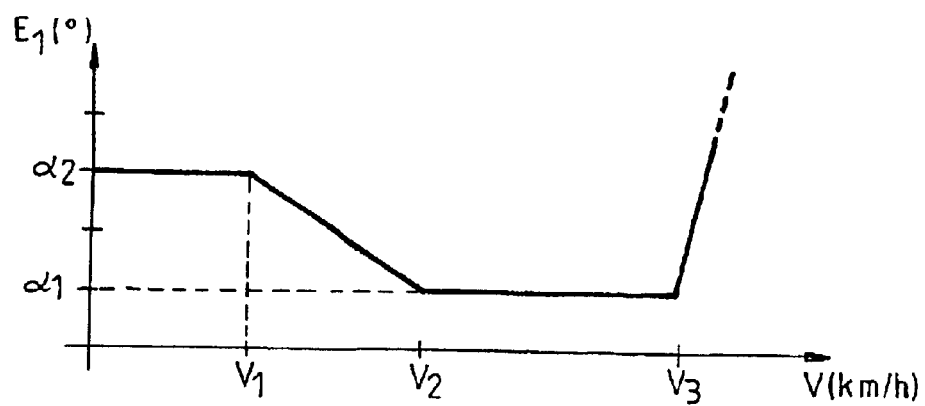

Other characteristics and advantages will appear in reading the following description made in reference to the drawings, in which:

FIG. 1 is a top view of a motor vehicle comprising lighting means for indicating a change in direction, FIG. 2 shows, in a diagram, the structure and functioning of a device for indicating the change in direction according to the invention, FIG. 3 shows a curve illustrating the variation according to the invention of a threshold of the turning of the wheels of the vehicle as a function of the speed of the vehicle.

The vehicle 1 shown in FIG. 1 comprises means 2, 12 designed to indicate a change in direction by generating light signals 9. Traditionally, for each side of the vehicle, the means 2, 12 for indicating a change in direction can be comprised of blinking lights. These blinking lights 2, 12 can be located in the front, in the rear, and possibly in the central part of the vehicle 1 in the form of lateral repeaters.

Referring now to FIG. 2, the device for indicating a change in direction according to the invention comprises means 5, 6, 7, 8, 10 for collecting data relating to the functioning conditions of the vehicle. These means for collecting data are connected to means 4, 3 for controlling the supply voltage of the light signaling means 2, 12.

More specifically, the electronic architecture of the lighting device can be a multiplexed architecture, for example, of the ADV or ADC type.

The means 3, 4 for controlling the lighting of the blinking lights 2, 12 comprise a control computer 4, for example, the smart control unit (BSI—Boîtier de Servitude Intelligent) of the vehicle. Preferably, the means 5, 6, 7, 8, 10 for collecting data relating to the functioning conditions of the vehicle are connected to the control computer 4.

The control computer 4 is connected, via a bus 11, to an actuator 3 suitable for delivering or not delivering a supply voltage to the light signaling means 2, 12. The actuator 3 is connected, by means of a first line 13, to the blinking lights 2 located on a same side of the vehicle 1. The actuator 3 is also connected, by means of a second line 14, to the blinking lights 12 located on the other side of the vehicle.

The means for collecting data relating to the functioning conditions of the vehicle comprise means for measuring the turning angle of the wheels, such as a sensor 5 of an angle of the steering wheel. The means for collecting data also comprise means 6 for detecting the presence or not of another adjacent vehicle located in front of and/or behind and/or to the side relative to the vehicle 1.

According to the invention, when the presence of an adjacent vehicle is detected and, simultaneously, the turning angle of the wheels is greater than a specified threshold value E1, the computer 4 commands the actuator 3 to automatically switch on the light signals 2, 12 located on the side of the vehicle corresponding to the turning of the wheels.

The means 6 for detecting the presence of an adjacent vehicle can be constituted, for example, by a system using radar such as that of an anti-collision device. Traditionally, these anti-collision systems are arranged in the front and rear parts of the vehicle in order to detect the presence and the distance of the vehicles, located upstream and/or downstream and possibly to the side, by using the phenomenon of reflection of radar waves.

Of course, the means for detecting the presence of an adjacent vehicle can be constituted by any other equivalent device such as, for example, a system 7 for the reception of information representing the state of road traffic transmitted by transmitting means such as a satellite. In other words, the control computer 4 can be informed of the possible presence of an adjacent vehicle by satellite information means such as a "GPS".

The threshold turning angle E1 of the wheels necessary in order to trigger the automatic switching on of the light signaling means 2, 12 is, for example, between 10 and 40 degrees and, preferably, is approximately equal to 30 degrees.

Advantageously, the means for collecting data comprise means 10 for determining the speed V of the vehicle, such as a speed sensor.

According to the invention, the threshold angle E1 of the turning of the wheels necessary for automatically switching on the turn signal means 2, 12 can vary as a function of the speed V of the vehicle.

FIG. 3 shows an example of variation of the threshold turning angle E1 of the wheels as a function of the speed V of the vehicle. In particular, when the speed V of the vehicle is less than or equal to a specified first speed V1, for example, of approximately between 10 and 40 km/h, the threshold value E1 of the turning angle of the wheels is approximately equal to a specified first constant value $\alpha 2$. Preferably, the first speed V1 is approximately equal to 20 km/h. The first constant value $\alpha 2$ is itself between 20 and 40 degrees and preferably on the order of 30 degrees.

In addition, when the speed V of the vehicle is between the first speed V1 and a specified second speed V2 greater than the first speed V1, the threshold value E1 of the turning angle of the wheels decreases when the speed V of the vehicle increases. The second speed V2 is, for example, approximately between 40 and 60 km/h and is preferably equal to 50 km/h. Preferably also, the threshold turning angle E1 is inversely proportional to the speed V of the vehicle between the first speed V1 and second speed V2.

When the speed V of the vehicle is between the second speed V2 and a specified third speed V3 greater than the second speed, the threshold value E1 of the turning angle of the wheels is approximately equal to a specified second constant value $\alpha 1$. The second constant $\alpha 1$ is, for example, between 5 and 20 degrees and preferably equal to 10 degrees.

Finally, when the speed V of the vehicle is greater than the third speed V3, the threshold value E1 of the turning angle of the wheels can increase when the speed of the vehicle increases. Preferably, beyond the third speed V3, the threshold turning angle E1 increases linearly with the speed of the vehicle.

The device according to the invention thus makes it possible to effectively signal changes of direction of a vehicle while adapting to the usage conditions of the vehicle.

Of course, the invention is not limited to the preferred embodiment mode described above.

Thus, replacing the means 7, 8 for detecting an adjacent vehicle, or in combinations with them, the device according to the invention can comprise means 8 for detecting the position of the vehicle 1 relative to the marking lines on the ground separating the traffic lanes. These detection means 8 are suitable in particular for detecting the possible crossing of these lines by the vehicle.

Traditionally, these detection means 8 can be made of a system for emitting infrared waves and receiving waves reflected by the ground, such as those described in the document EP 860001.

In this manner, when crossing of a marking line on the ground, even partially, is detected, or when the vehicle comes very close to it, and the turning angle of the wheels is greater than the threshold E1, the computer 4 commands the automatic switching on of the corresponding signal means 2, 12. As a variation, the infrared detection means 8 can also ensure the detection of the presence of an adjacent vehicle.

Thus, it is easy to understand that the invention makes it possible to significantly improve safety on major roads.

Finally, though the invention has been described in connection with specific embodiment modes, it comprises all technical equivalents of the means described.

What is claimed is:

1. Method for indicating a change in direction of a motor vehicle, in which a turning angle of wheels of the vehicle is detected for the purpose of automatically switching on lighting means for indicating a change in direction, said method comprising a step of detecting the presence of another adjacent vehicle and/or the crossing of a marking line on the ground separating traffic lanes, and, when the turning angle of the wheels is greater than a specified threshold value and the presence of an adjacent vehicle and/or the crossing of a line separating traffic lanes is detected, the lighting means for indicating a change in direction are switched on automatically.

2. Method according to claim 1, comprising a step of measuring a speed of the vehicle and a step of determining the threshold value of the turning angle as a function of the speed of the vehicle.

3. Method according to claim 2, wherein, when the speed of the vehicle is less than or equal to a first specified speed, the threshold value of the turning angle of the wheels is approximately equal to a first specified constant value.

4. Method according to claim 3, wherein, when the speed of the vehicle is between the first speed and a specified second speed greater than the first speed, the threshold value of the turning angle of the wheels decreases when the speed of the vehicle increases.

5. Method according to claim 4, wherein, when the speed of the vehicle is between the second speed and a specified third speed greater than the second speed, the threshold value of the turning angle of the wheels is approximately equal to a specified constant second value.

6. Method according to claim 1, wherein, when the speed of the vehicle is less than or equal to a first specified speed, the threshold value of the turning angle of the wheels is approximately equal to a first specified constant value.

7. Method according to claim 6, wherein, when the speed of the vehicle is between the first speed and a specified second speed greater than the first speed, the threshold value of the turning angle of the wheels decreases when the speed of the vehicle increases.

8. Method according to claim 7, wherein, when the speed of the vehicle is between the second speed and a specified third speed greater than the second speed, the threshold value of the turning angle of the wheels is approximately equal to a specified constant second value.

9. Method according to claim 1, wherein the detecting step is a step of detecting the presence of another adjacent vehicle.

10. Method according to claim 1, wherein the detecting step is a step of detecting the crossing of a marking line on the ground separating traffic lanes.

11. Method according to claim 10, wherein the detecting step is a step of detecting the crossing of a marking line on the ground separating traffic lanes.

12. Device for indicating a change in direction of a motor vehicle, comprising light signaling means, means for collecting data relating to the functioning conditions of the vehicle, suitable for determining the turning of the vehicle wheels, and means for controlling the supply voltage of the light signaling means, wherein the means for collecting data are adapted to detect the presence or not of another adjacent vehicle and/or the crossing of a marking line on the ground separating the traffic lanes, in order to ensure the automatic switching on of the light signaling means when the turning angle of the wheels is greater than a specified threshold value and the presence of an adjacent vehicle and/or the crossing of a line separating traffic lanes is detected.

13. Device according to claim 12, wherein the means for collecting data are adapted to determine a speed of the vehicle, and the means for controlling the supply voltage determine the threshold value of the turning angle of the wheels as a function of the speed of the vehicle.

14. Device according to claim 13, wherein the means for collecting data relating to the functioning conditions of the vehicle comprise detecting means of the radar type, in order to detect the possible presence of another adjacent vehicle.

15. Device according to claim 13, wherein the means for collecting data relating to the functioning conditions of the vehicle comprise means for receiving information relating to the state of road traffic emitted by the emitting means of the satellite type, in order to detect the possible presence of another adjacent vehicle.

16. Device according to claim 13, wherein the means for collecting data relating to the functioning conditions of the vehicle comprise means for detecting a position of the vehicle relative to marking lines on the ground separating traffic lanes, in order to detect a possible crossing of these lines by the vehicle.

17. Device according to claim 12, wherein the means for collecting data relating to the functioning conditions of the vehicle comprise detecting means of the radar type, in order to detect the possible presence of another adjacent vehicle.

18. Device according to claim 17, wherein the means for collecting data relating to the functioning conditions of the vehicle comprise means for receiving information relating to the state of road traffic emitted by the emitting means of the satellite type, in order to detect the possible presence of another adjacent vehicle.

19. Device according to claim 17, wherein the means for collecting data relating to the functioning conditions of the vehicle comprise means for detecting a position of the vehicle relative to marking lines on the ground separating traffic lanes, in order to detect a possible crossing of these lines by the vehicle.

20. Device according to claim 12, wherein the means for collecting data relating to the functioning conditions of the vehicle comprise means for receiving information relating to the state of road traffic emitted by the emitting means of the satellite type, in order to detect the possible presence of another adjacent vehicle.

21. Device according to claim 20, wherein the means for collecting data relating to the functioning conditions of the vehicle comprise means for detecting a position of the vehicle relative to marking lines on the ground separating traffic lanes, in order to detect a possible crossing of these lines by the vehicle.

22. Device according to claim 12, wherein the means for collecting data relating to the functioning conditions of the vehicle comprise means for detecting a position of the vehicle relative to marking lines on the ground separating traffic lanes, in order to detect a possible crossing of these lines by the vehicle.

23. Device according to claim 22, wherein the means for detecting a position of the vehicle comprise an infrared emitting and receiving means.

24. Device according to claim 12, wherein, when the speed of the vehicle is less than or equal to a first specified speed, the threshold value of the turning angle of the wheels is approximately equal to a first specified constant value.

25. Device according to claim 24, wherein, when the speed of the vehicle is between the first speed and a specified second speed greater than the first speed, the threshold value of the turning angle of the wheels decreases when the speed of the vehicle increases.

26. Device according to claim 25, wherein, when the speed of the vehicle is between the second speed and a specified third speed greater than the second speed, the threshold value of the turning angle of the wheels is approximately equal to a specified constant second value.

27. Device according to claim 12, wherein the data collecting means is adapted to detect the presence or not of another adjacent vehicle.

28. Device according to claim 12, wherein the data collecting means is adapted to detect the crossing of a marking line on the ground separating the traffic lanes.

29. Device according to claim 28, wherein the data collecting means is adapted to detect the crossing of a marking line on the ground separating the traffic lanes.

* * * * *